UNITED STATES PATENT OFFICE.

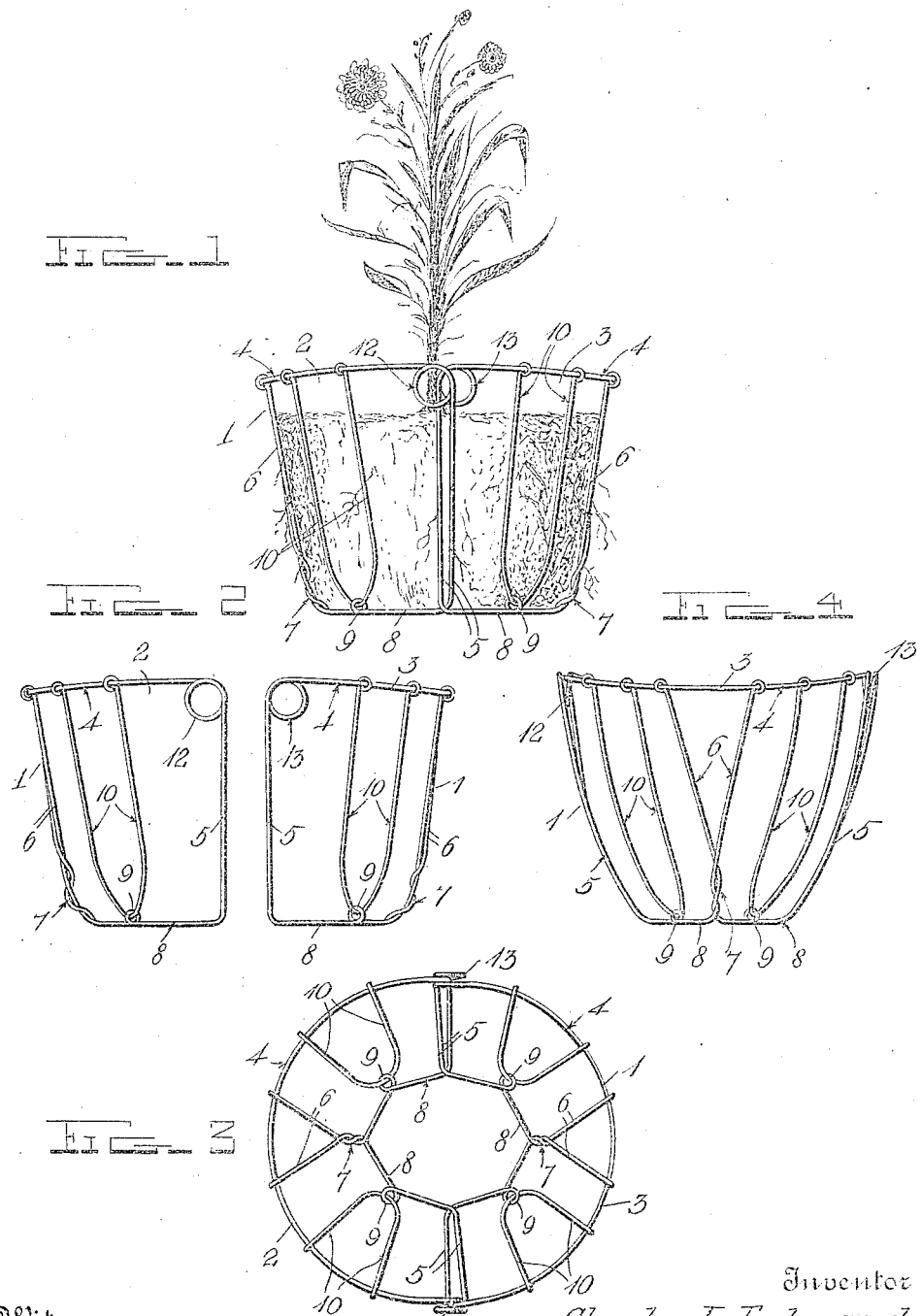

CHARLES L. EDWARDS, OF DALLAS, TEXAS.

TRANSPLANTING-BASKET.

No. 879,613.    Specification of Letters Patent.    Patented Feb. 18, 1908.

Application filed November 7, 1907. Serial No. 401,154.

*To all whom it may concern:*

Be it known that I, CHARLES L. EDWARDS, a citizen of the United States, residing at Dallas, in the county of Dallas and State of Texas, have invented certain new and useful Improvements in Transplanting-Baskets; and I do declare the following to be a full, clear, and exact description of the invention, such as will enable others skilled in the art to which it appertains to make and use the same.

This invention relates to improvements in transplanting baskets, for plants, shrubs, trees, and the like.

The object of the invention is to provide a device of this character, by means of which plants may be started into growth and afterwards reset or transplanted without materially disturbing their roots.

A further object is to provide a transplanting device which will be simple, strong, durable and inexpensive in construction, efficient and reliable in operation, and well adapted to the purpose for which it is designed.

With the foregoing and other objects in view, the invention consists of certain novel features of construction, combination and arrangement of parts, as will be more fully described and particularly pointed out in the appended claims.

In the accompanying drawings: Figure 1 is a side view of the transplanting basket, constructed in accordance with the invention, and showing the parts in operative position, and inclosing the roots of a plant, and the ball of earth around the roots. Fig. 2 is a similar view of the basket showing the parts separated to permit the removal of the plant. Fig. 3 is a top plan view of the basket; and Fig. 4 is an end view of the same.

Referring more particularly to the drawings, 1, denotes the basket, which may be of any desired size and is preferably constructed of non-corrosive metal wire. The basket is formed in separable sections, 2 and 3, identical in form, each comprising a curved or segmental top or upper bar, 4, inner end bars, 5, and a pair of intermediate bars, 6, the upper ends of which are bent in the form of eyes and secured to the top bar, 4. The lower portions of the bars, 6, are twisted together, as shown at 7, after which said bars are extended in a substantially horizontal plane to form the bottom bars, 8, of the basket, all of these parts being integral. The bottom pieces, 8, have formed therein between the twisted portions, 7, of the end bars, and the side bars, 5, upwardly projecting eyes or loops, 9. The bottom bars, 8, curve outwardly in a horizontal plane to form a central opening in the bottom of the basket, when the sections are brought together, through which the downward growing roots of the plant may pass.

The eyes or loops, 9, are engaged with the lower ends of intermediate pairs of side bars, 10, which project upwardly between the bars, 6, and the outer bars, 5, and are secured at their upper end by eyes or loops to the curved top bar, 4.

On one side of the section, 2, at the upper corner of the same, formed by the inner side bar, 5, and the top bar, 4, is a fastening coil, 12, with which is engaged the upper inner corner of the opposite section, 3, of the basket. In the section, 3, at the corner formed by the opposite side bar and top bar thereof is formed a fastening coil, 13, with which is engaged the corner formed by the side and top bars of the adjacent side section, 2, said fastening coils 12 and 13 thereby detachably connecting said sections of the basket together and firmly holding the same against casual disengagement, but permitting the sections to be readily separated when it is desired to remove the same from the roots of the plant.

By means of a basket constructed as herein shown and described, plants may be started into growth and afterwards readily moved, and reset with little or no disturbance of the roots thereof, as the basket will securely hold the ball of earth in place around the roots, while the plant is being moved.

The construction of the basket is such that the main and lateral roots of the plant may pass readily through the same so that if desired the basket need not be removed from the plant when being transplanted, but may be reset in the ground with the plant. The construction of the basket is also such, that the same may be readily used for hanging baskets, and may be placed inside flower pots to permit the ready removal of the plant therefrom. The baskets are intended to be made in various sizes, and to be used not only in connection with small plants, but also will be made in such sizes, and of such strength as to enable the same to be used for transplanting large shrubs or trees, and in the construction of these larger sizes of baskets, it may be found expedient to provide more bars around the sides thereof, and also one or more cross wires running at right angles or diagonally to the side bars. It will also be understood that the side and end bars may be curved to a greater or less degree at their lower ends to form baskets of slightly different shapes.

Having thus described my invention, what I claim as new and desire to secure by Letters-Patent, is:

1. A transplanting basket comprising a pair of separable open wirework sections, and means formed integral with said sections to detachably connect the same together, substantially as described.

2. A transplanting basket, comprising a pair of separable sections, identical in construction and formed of a series of wire rods or bars, and fastening coils formed at one of the upper inner corners of each of said sections, whereby said sections may be detachably connected together, substantially as described.

3. A transplanting basket, formed in separable sections, identical in construction, each of which comprises a curved or segmental top bar formed of wire, integrally formed outer side and end bars, intermediate side bars arranged between said end outer bars, and a fastening coil formed in one corner of each of said sections, whereby said sections may be detachably connected together to form the basket, substantially as described.

4. A transplanting basket comprising a pair of separable sections constructed to form an opening in the bottom when said sections are brought together in an operative position, thereby forming a root outlet, and integrally formed fastening devices to detachably connect said sections together, substantially as described.

5. A transplanting basket formed in separable sections identical in construction, each comprising a curved top bar, integrally formed outer side and end bars, intermediate side bars arranged between said outer side and end bars, integrally formed, outwardly curved bottom bars adapted to form an opening in the bottom of the basket when said sections are in operative position, thereby forming a root outlet and means to detachably connect said sections together, substantially as described.

In testimony whereof I have hereunto set my hand in presence of two subscribing witnesses.

CHARLES L. EDWARDS.

Witnesses:
  GEO. W. CRUTCHER,
  HENRY BEVERLY STRANGE.